UNITED STATES PATENT OFFICE.

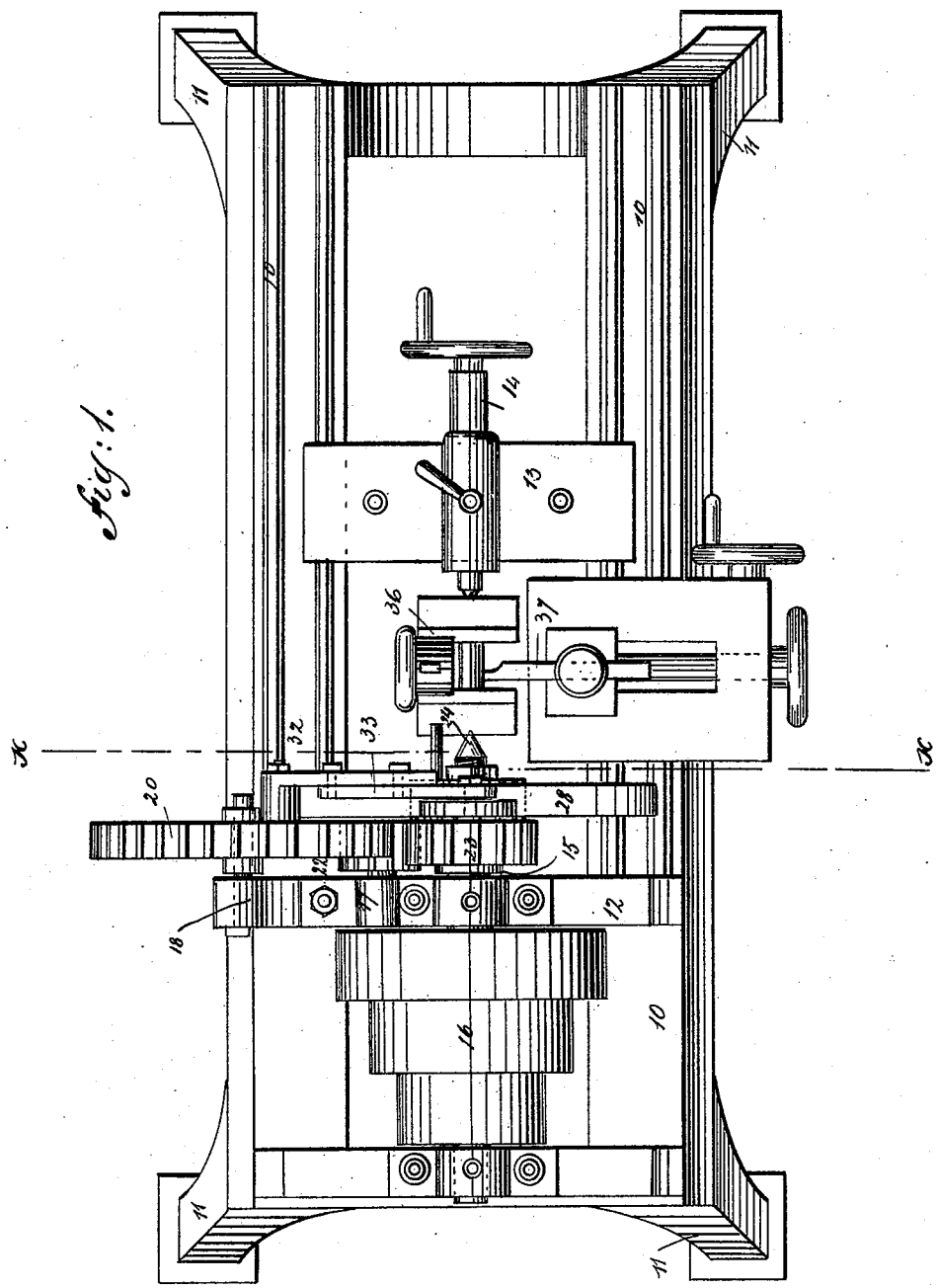

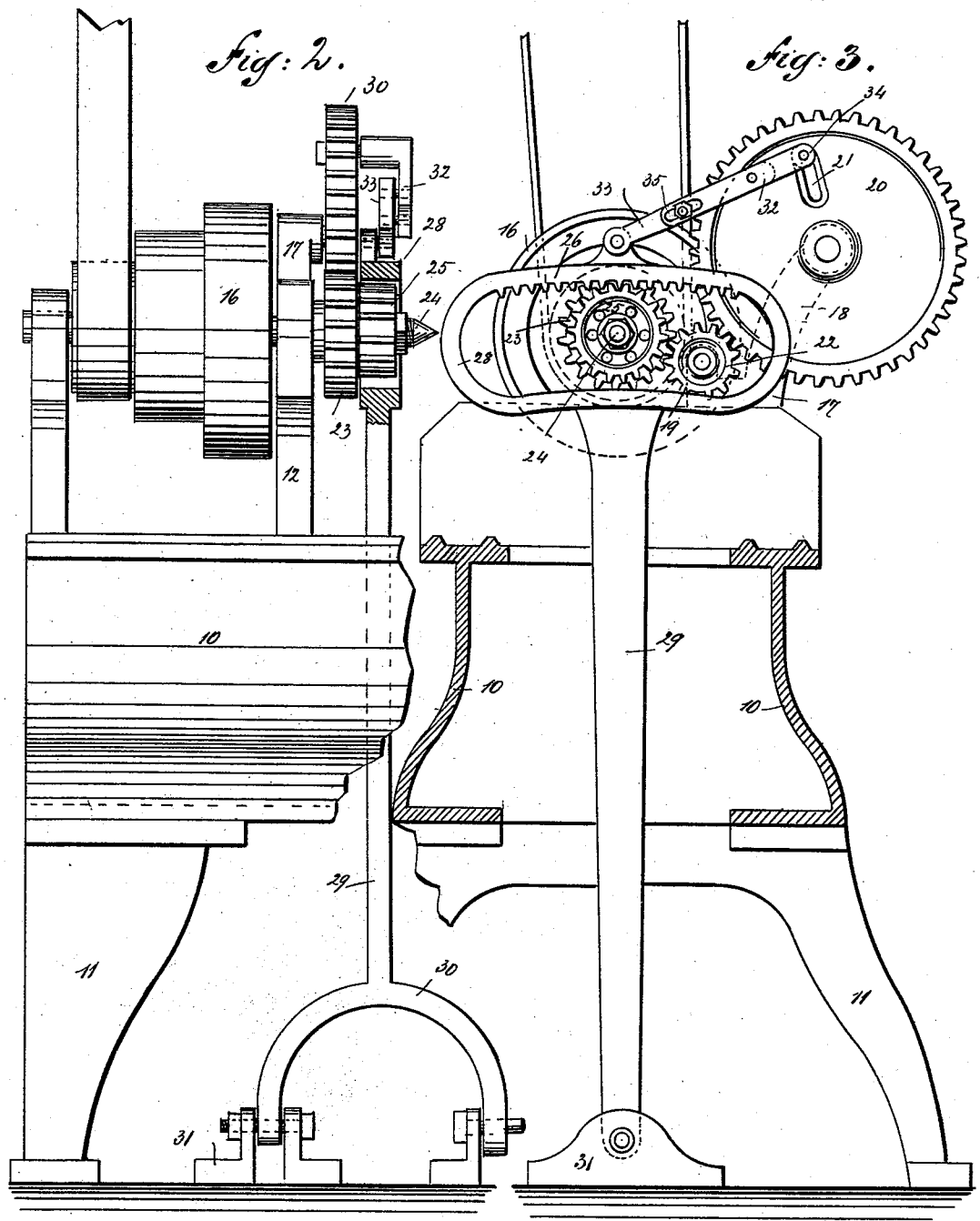

PLINY FRANKLIN COLE, OF WARREN, PENNSYLVANIA.

LATHE ATTACHMENT FOR TURNING WRIST-PINS.

SPECIFICATION forming part of Letters Patent No. 414,897, dated November 12, 1889.

Application filed August 20, 1889. Serial No. 321,348. (No model.)

*To all whom it may concern:*

Be it known that I, PLINY FRANKLIN COLE, of Warren, in the county of Warren and State of Pennsylvania, have invented a new and Improved Lathe Attachment, of which the following is a full, clear, and exact description.

My invention relates to an improvement in lathe attachments especially adapted for turning the wrists of cross-heads and similar articles, and has for its object to provide mechanism more simple and positive than at present in use for that purpose, which mechanism is capable of being used in connection with any style of lathe.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a plan view of a lathe having the attachment applied. Fig. 2 is a side elevation, the link being in transverse section; and Fig. 3 is a transverse section on line *x x* of Fig. 1.

The lathe bed or shears 10 is supported upon legs or standards 11, and carries at its opposite ends a head-stock 12 and a tail-stock 13, provided with a dead-center 14 of any suitable form. A live-spindle 15 is mounted in suitable bearings upon the head-stock and bed, and a cone or stepped pulley 16 is keyed or otherwise secured to the said spindle. Upon the head-stock, at one side, a bracket 17 is bolted or otherwise secured, provided with two arms 18 and 19, projected upward from the body, as shown in dotted lines in Fig. 3, the arm 18 being the longer, and curved upward and outward in the direction of the side of the lathe. Upon the upper end of the arm 18 of the bracket 17 a spur-wheel 20 is pivoted, provided with a diametrical slot 21, as shown in Fig. 3, and upon the shorter arm 19 of the bracket a pinion 22 is pivoted, meshing with the teeth of the spur-gear 20. The pinion 22 also meshes with a small spur-wheel 23, rigidly secured to the live-spindle 15 in front of the head-stock 12. In the inner end of the live-spindle 15 a live-center 24 is tightly inserted, and upon the said center 24 a pinion 25 is loosely mounted, held in place by a nut secured upon the center, or in any other approved manner, which pinion meshes with teeth 26, formed upon the inner upper edge of a horizontal reciprocating link 28. This link 28 is guided in its lateral movement by an integral shank 29, which shank passes downward between the shears 10, being preferably bifurcated at its lower extremity, as illustrated at 30 in Fig. 2, and pivoted at said bifurcated end between suitable base-blocks 31.

A reciprocating movement is communicated to the link 28 by the rotary gear 20, through the medium of connecting-rods 32 and 33, one connecting-rod being provided at its end with a wrist-pin 34, adapted to travel in the slot 21 of the said rotating gear 20, and at the other end of the connecting-rod carrying the wrist-pin a longitudinal slot 35 is produced, and the two connecting-rods are attached by a set-screw or nut and bolt passed through the slot 35 of one rod into the other.

By varying the shape of the bracket 17 and shortening or lengthening the connecting-rods the attachment may be readily applied to almost any form of lathe.

A long or a short motion of the link may be obtained by moving the end of the connecting-rod 32, carrying the wrist-pin, from or toward the center of the gear to which it is attached.

It will readily be observed that the spindle 15 communicates a rotary motion to the gear 23, which in turn, through the pinion 22, revolves the larger gear 20, and that as the latter gear revolves through the medium of the connecting-rods 32 and 33 a reciprocating movement is communicated to the link 28, and the said link being geared with the pinion upon the live-center 24 the pinion 25 is in consequence given a rotary reciprocating movement.

In the drawings the cross-head 36 of a steam-engine is shown secured between the live and dead centers 14 and 24, and a cutting-tool 37 is also shown in contact with the pin of the cross-head, and as the cross-head is clamped to the pinion 25, the said pinion is rotarily reciprocated. A similar motion is imparted to the cross-head, whereby the cutting-tool is made to travel over more than half the circumference of the pin, so that when the cross-head is reversed the pin is finished perfectly round.

By securing the pinion 25 upon the live-center 24 in the manner described the pinion may be readily removed from its place in the link and its position changed to adjust the work in any way desired.

Having thus described my invention, I claim as new and desire to secure by Letters Patent—

1. The combination, with a pinion tightly secured to the lathe-spindle, and a master-wheel rotated thereby, of a center tightly fitted in the spindle, a horizontal link geared to a pinion loosely attached to said center and movable thereon, and a connecting-rod uniting the master-wheel and the link, substantially as shown and described.

2. The combination, with a pinion tightly secured to the lathe-spindle, and a master-wheel rotated thereby, of a center tightly fitted in said spindle, a horizontal link geared to a pinion loosely attached to said center and movable thereon, and an adjustable connecting-rod uniting the master-wheel and the link, substantially as shown and described, whereby the said movable pinion is given a rotary reciprocating movement, as and for the purpose specified.

3. The combination, with a pinion tightly secured to the lathe-spindle, a center tightly mounted in one end thereof, a movable pinion mounted on said center, and a master-wheel rotated by the spindle through the pinion thereon, of a horizontal link geared to the movable pinion, adjustable connecting-rods uniting the master-wheel and the link, and a guide-shank pivoted at one end to a firm support and attached at the other end to the said link, substantially as and for the purpose specified.

4. The combination, with a lathe-spindle having attached thereto a spur-wheel, and a center tightly secured in the outer end of the spindle, the said center having attached thereto and movable thereon a pinion, of a bracket secured to the head-stock, a master-wheel pivoted upon one member of the bracket, a pinion pivoted upon the other member connecting the spur-wheel upon the spindle and the master-wheel, a link having teeth formed upon the upper inner surface thereof meshing with the movable pinion on the center, and adjustable connecting-rods uniting the master-wheel and the link, substantially as and for the purpose specified.

PLINY FRANKLIN COLE.

Witnesses:
S. S. COLE,
C. S. FAIRCHILD.